2,976,030

TWO STEP ESTERIFICATION PROCESS OF TEREPHTHALIC ACID

Delbert H. Meyer, Highland, Ind., assignor to Standard Oil Company, Chicago, Ill., a corporation of Indiana No Drawing. Filed May 20, 1957, Ser. No. 660,056

2 Claims. (Cl. 260—475)

This invention relates to the esterification of aromatic carboxylic acids with methanol or ethanol.

The methyl and ethyl esters of aromatic carboxylic acids are well known commercial materials. In the preparation of these esters the reaction rate is undesirably slow, particularly when no catalyst is used in the process. Even with catalyst present in the esterification zone prolonged esterification times are needed and at present truly continuous operation is impractical.

An object of the invention is a process for esterifying aromatic carboxylic acids with methanol or ethanol. A further object is an esterification process which takes much shorter time than conventional processes. A particular object is a continuous process for preparing methyl or ethyl esters of aromatic carboxylic acids. Other objects will become apparent in the course of the detailed description.

The process of the instant invention utilizes two steps in the preparation of the methyl or ethyl ester of aromatic carboxylic acids with the second step substantially attaining the equilibrium product distribution of ester and unreacted materials.

In the first step of the process the aromatic carboxylic acid and methanol or ethanol are agitated at a temperature about the critical temperature of the particular alcohol, generally between about 235° C. and about 245° C. The first stage is operated at a pressure above the critical pressure of the particular alcohol and preferably somewhat higher for example, 2000 p.s.i. The acid and alcohol are intermingled in the first step reaction zone for a time which is determined by the presence or absence of a catalyst therein. The process may be operated with or without a catalyst but the time of contacting is necessarily different in each instance. In the absence of an esterification catalyst the first stage contacting is carried out for a time between about 10 minutes and 25 minutes. In the presence of an esterification catalyst the first stage contacting is carried out for a time of between about 5 and 15 minutes. Any of the known esterification catalysts may be utilized in the process; examples of these catalysts are aluminum sulfate, sulfuric acid, sulfonic acid, zinc metal powder, zinc oxide powder, antimony oxide, etc.

Immediately after the completion of the first stage contacting the reaction mixture present in the first stage is rapidly, over as short a period of time as conditions permit for example, 1–5 minutes, raised to a temperature between about 275° C. and 325° C. Herein the reaction mixture from step 1 is understood to mean the acid charged, the alcohol and reaction products produced in step 1. In step 2 the reaction mixture from step 1 is maintained in the defined temperature for a time about that needed to substantially attain the equilibrium conversion of carboxyl groups to ester groups, for the particular acid and alcohol reactants. The time and temperature relationship in the second step is determined by the alcohol and acid charged and may be readily determined by some simple tests on the particular combination being used.

The reaction product mixture of step 2 which consists of product ester, unreacted acid, unreacted alcohol and some by-products is then treated to separate the esterified product therefrom. The recovery of ester from the reaction product mixture of step 2 is entirely conventional and follows well known procedures.

The process may utilize all aromatic carboxylic acids or anhydrides thereof. Examples of suitable aromatic carboxylic acids and anhydrides are: benzoic, toluic, phthalic, phthalic anhydride, isophthalic, terephthalic, trimesic, trimellitic, trimellitic anhydride, hemimellitic, hemimellitic anhydride, prehnitic, mellitic, naphthoic, naphthalic anhydride, diphenic, and diphenic anhydride. The invention is particularly adapted to the preparation of methyl and ethyl esters of the various phthalic acids.

The charge to the first stage of the process consists of the aromatic carboxylic acid and the alcohol and catalyst if any. Although only 1 mol of alcohol is theoretically required for each mol of carboxyl groups desired to be esterified the degree of conversion and the rate is improved by the use of excess alcohol. In general between about 2 and 30 moles of alcohol are present per mole of carboxyl groups in the first stage reaction zone.

When operating with a catalyst the amount of catalyst used will be dependent upon the particular catalyst and the particular acid-alcohol combination. In general the catalyst usage may vary from as little as 0.001 weight percent based on charge to the reaction zone of step 1 to several weight percent. More usually the catalyst usage will vary from 0.1 to 1 weight percent.

It is to be understood that the process of the invention is not limited to any particular ratio of alcohol to acid or any particular amount of catalyst present or indeed catalyst itself.

The process is particularly suitable for esterifying terephthalic acid with methanol. When operating with terephthalic acid and methanol it is preferred to carry out the process as follows. In step 1 terephthalic acid and methanol are intermingled in a weight ratio of methanol to acid of between about 2 and 5; this corresponds to between about 10 and 26 moles of methanol per mole of acid charged. The first stage is carried out at a temperature of 240° C. In the absence of a catalyst the contacting is continued for about 20 minutes. In the presence of a catalyst the contacting is continued for about 10 minutes. The reaction product mixture from step 1 is rapidly increased in temperature to about 300° C. The second step is carried out in the absence of a catalyst for about 20 minutes. Or in the presence of a catalyst for about 10 minutes. Under these conditions in excess of 90% of the carboxyl groups present in the terephthalic acid charged are converted to ester groups. At the end of the reaction time in the second step the reaction product mixture consisting of ester, some unreacted acid, unreacted methanol and by-products such as mono-ester and ether are treated to recover the desired dimethyl terephthalate.

EXAMPLES

Studies were made on the degree of conversion of terephthalic acid and methanol and various temperatures and times without and with catalyst present in the reaction zone. These studies were carried out using as the reaction zone a ⅝ inch ID glass tube having about 9 ml. volumetric space. The terephthalic acid and the catalyst were weighted and the methanol was delivered volumetrically using a hypodermic syringe. The glass tube was then sealed by fusing the opening. The sealed tube was placed in a constant temperature bath provided with a rocking and oscillating mechanism which mechanism kept the contents of the tube well intermingled. After the reaction zone had been agitated in the bath for the desired time it was removed from the bath and allowed to cool to room temperature. After the tube had reached room temperature it was opened and the contents transferred to a beaker; the tube was washed with 100 ml. of ethyl alcohol and 100 ml. of benzene to insure removal of all the material therefrom. The degree of conversion of the carboxyl groups to acids groups was determined by titration with 0.02 normal aqueous sodium hydroxide using phenol red as the indicator; when it was believed that the conversion would be low, by presence of considerable unchanged TPA in the tube, the titration was carried out with 0.1 normal sodium hydroxide.

In the examples illustrating the invention namely, Tests No. 3 and 5 the tests were carried out by placing the sealed tube in a bath adjusted to maintain a temperature between 245 and 250° C. After remaining in this bath for the desired time the tube was removed from the bath and placed in a bath maintained at about 300° C. At the completion of the desired time in the second bath the tube was removed and processed as described above.

The results of the tests are set out in the annexed table. In all of the tests except Test No. 1, 3 parts by weight of methanol were present for each part of terephthalic acid. In those tests using catalyst the catalyst was a mixture of about equal parts of zinc metal powder and zinc oxide powder. The catalyst usage is set out as weight percent based on the methanol and acid charged.

In Test No. 1 the reactants were maintained at about the critical temperature of methanol for a total time of 77 minutes; no catalyst was present. In this test 81% of the carboxyl groups were converted to ester groups. In Test No. 2 the reactants were heated at 300° C. for a time of 20 minutes in the absence of catalyst. In Test No. 2 only an appreciable amount of conversion took place. Test No. 3 was carried out under the conditions of the invention in two steps labeled *a* and *b* in the table. The first step was carried out at about the critical point of methanol for a time of 20 minutes. The second step was carried out at 300° C. also for 20 minutes; no catalyst was used in Test No. 3. In Test No. 3 the 94% conversion obtained represents about the equilibrium amount of carboxyl group conversion obtainable under these conditions. Test 3 shows that by the two step procedure an excess of 90% conversion was obtained as compared with the virtually negligible conversion in Test 2 and the lower conversion in approximately double the contacting time of Test 1. It is pointed out that the yield of Test 1 was assisted by the fact that almost three times as much alcohol was present in the reaction zone in this test than in Tests 2 and 3.

Table

| Test No. | Temp., °C. | Time, Minutes | Catalyst Type | Catalyst Amount, percent | Percent Carboxyl Groups Converted |
|---|---|---|---|---|---|
| 1 | 245–250 | 77 | None | | 81 |
| 2 | 300 | 20 | None | | 7 |
| 3 {a | 245–250 | 20 | None | | |
| 3 {b | 300 | 20 | None | | 94 |
| 4 | 300 | 20 | Zn, ZnO | 0.25 | 30 |
| 5 {a | 245–250 | 10 | Zn, ZnO | 0.25 | |
| 5 {b | 300 | 10 | Zn, ZnO | 0.25 | 96 |

Note.—All tests at 3/1 weight ratio of methanol and terephthalic acid except Test No. 1 which was at 8/1.

Tests 4 and 5 were carried out using the Zn, ZnO catalyst. In Test No. 4 which was carried out at 300° C. for 20 minutes only 30% of the carboxyl groups were converted. In Test No. 5 in the first step the reactants were maintained at about the critical temperature of methanol for a time of 10 minutes; the second step was carried out at 300° C. also for 10 minutes. The product mixture from Test No. 5 showed that equilibrium conversion had been attained at 96% carboxyl groups converted. Thus Test 5 shows that by the use of the process of the invention the conversion is more than tripled over running at the elevated temperature for the same total contacting time.

It is self evident from the working examples that by the use of the process of this invention a continuous operation is possible. In a continuous operation, which is preferably carried out in the presence of catalyst to decrease the size of vessels, the alcohol, the aromatic carboxylic acid and the catalyst are premixed and passed through a high capacity heat exchanger to rapidly raise the heat of the reaction mixture to about 245° C. The preheated mixture is then passed into a reaction zone wherein the materials are maintained at about 245° C. and about 2000 p.s.i. for an average time of 10 to 15 minutes. Continuously material is withdrawn from the first reaction zone and is passed through a high capacity heat exchanger where the temperature is raised over a period of 2 to 3 minutes to about 300° C. From the heat exchanger the material is passed into a second reaction zone where it is maintained at about 300° C. at about 2000 p.s.i. for a total average time of 10 minutes. At the end of this time the contents of the second reaction zone will have an excess of 90% of the carboxyl groups converted to ester groups. Material is continuously withdrawn from the second reaction zone and is passed to a recovery system wherein alcohol is distilled overhead for reuse in the process, the liquid ester is separated from unconverted solid acid. The liquid ester may then be purified by various techniques known to the art.

Thus having described the invention, what is claimed is:

1. A process for making dimethyl terephthalate which process comprises (1) intimately contacting terephthalic acid and methanol, in a weight ratio of methanol to acid of between about 2 and 5, at a temperature of about 240° C. at autogenous pressure for a time of about 20 minutes in the absence of a catalyst, (2) increasing rapidly the temperature of the reaction mixture from step 1 to a temperature of about 300° C. and maintaining said temperature, at autogenous pressure, for a time of about 20 minutes in the absence of a catalyst and (3) recovering dimethyl terephthalate from the reaction product mixture of step 2.

2. A process for making dimethyl terephthalate which process comprises (I) intimately contacting terephthalic acid and methanol, in a weight ratio of methanol to acid of between about 2 and 5, at a temperature of about 240° C. at autogenous pressure for a time of about 10 minutes in the presence of a hereinafter defined catalyst, (II) increasing rapidly the temperature of the reaction mixture from step I to about 300° C. and maintaining said temperature at autogenous pressure for a time of about 10 minutes in the presence of a hereinafter defined catalyst and (III) recovering dimethyl terephthalate from the reaction product mixture of step II, wherein said catalyst is selected from the class consisting of zinc, zinc oxide, and antimony oxide and said catalyst is present in an amount between about 0.1 and 1 percent by weight based on total charge to step I.

References Cited in the file of this patent

UNITED STATES PATENTS

| | | |
|---|---|---|
| 2,459,014 | Cavanaugh et al. | Jan. 11, 1949 |
| 2,491,660 | Gresham | Dec. 20, 1949 |
| 2,802,861 | Van Dijk et al. | Aug. 13, 1957 |
| 2,825,738 | Ellendt et al. | Mar. 4, 1958 |
| 2,873,292 | Meyer | Feb. 10, 1959 |
| 2,876,252 | Lotz et al. | Mar. 14, 1959 |